Feb. 8, 1944.  O. H. YOXSIMER  2,341,200

REFRIGERATOR CABINET CONSTRUCTION

Filed Dec. 12, 1941

WITNESSES:

INVENTOR
ORLAND H. YOXSIMER
BY
ATTORNEY

Patented Feb. 8, 1944

2,341,200

UNITED STATES PATENT OFFICE 2,341,200

REFRIGERATOR CABINET CONSTRUCTION

Orland H. Yoxsimer, Mansfield, Ohio, assignor to Westinghouse Electric & Manufacturing Company, East Pittsburgh, Pa., a corporation of Pennsylvania Application December 12, 1941, Serial No. 422,619

2 Claims. (Cl. 20—69)

This invention relates to refrigerator cabinet construction and more especially to the sealing gasket of the door of such a cabinet.

It is an object of the invention to provide a soft gasket which remains in alignment at unsecured portions of the sealing gasket.

Another object of the invention is to provide a sealing gasket which easily yields to deflection in one direction and resists bending in another direction.

A further object of the invention is to provide a sealing gasket which readily yields to deflection in one direction, resists bending in another direction but retains sufficient flexibility for bending at rounded corners in said last-mentioned directions.

These and other objects are effected by my invention as will be apparent from the following description and claims taken in connection with the accompanying drawing, forming a part of this application, in which:

Figure 1:
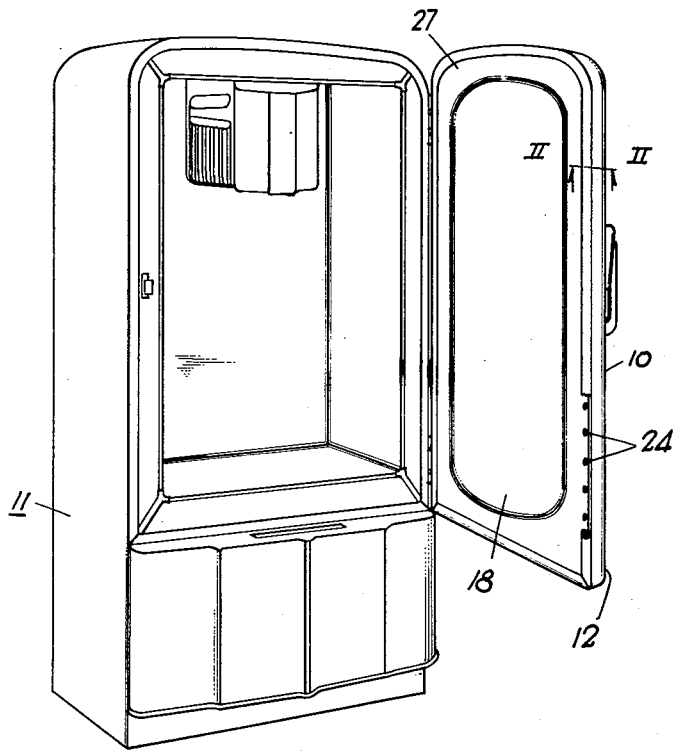
Fig. 1 is a view in perspective of a refrigerator cabinet embodying the gasket of my invention.
Figure 2:
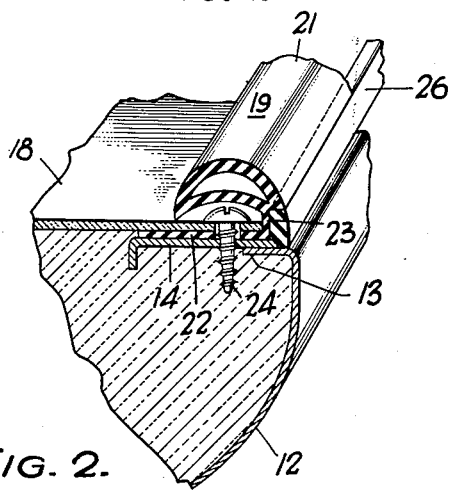
Fig. 2 is an enlarged perspective of a section of a door taken on the line II—II of Fig. 1.

Referring to the drawing for a detailed description of the invention, the reference numeral 10 designates a door for a refrigerator cabinet 11. The door comprises a dished outer panel 12 of sheet metal, the edges of which are bent inwardly throughout the periphery of the panel 12 to provide a flange 13 lying in one plane. A reinforcing frame 14 is welded to the flange 13 to form an extension of the same.

The door 10 also comprises an inner panel 18 of thin, stiff, heat-insulating material, such as one of the well-known plastics or synthetic materials or paper impregnated with a resinous condensation product and known by the trade name "Micarta." The panel 18 extends substantially to the outer margin of the door 10. A sealing gasket 19 of rubber is disposed at the outer margin of the inner panel 18 and comprises a tubular member 21 of crescent-shaped cross section and an attachment flange 22 connected by a web 23 to one edge of the tubular member 21.

The flange 22 of the sealing gasket 19 is interposed between the margin of the inner panel 18 and the frame 14, and the door structure is fastened together by sheet metal screws 24 which pass through the inner panel 18, through the flange 22 of the sealing gasket 19 and engage the frame 14. The space between the screws 24 is equal to approximately twice the width of the gasket 19. The tubular portion 21 of the gasket 19 overlies the heads of the sheet metal screws 24 and the web portion 23 of the gasket 19 lies adjacent the outer edge of the inner panel so that the gasket 19 completely surrounds said edge.

The tubular member 21, the flange 22, and the web 23 are formed of soft rubber of about 60 Durometer hardness so that the tubular member 21 yields to the pressure of the cabinet when the door 10 is closed without offering undue resistance to its closing. A strip 26 of semi-soft rubber having a Durometer hardness of 80 is secured to one edge of the tubular member 21 and to the web 23. The gasket 19 is formed by an extrusion process in which the material for the soft members 21, 22, and 23 is extruded together with the material for the semi-soft member 26, and the entire gasket 19 is vulcanized at one time. The gasket 19, however, may also be formed by securing separate strips of soft and semi-soft rubber together to form an integral gasket.

The strip 26 provides the necessary stiffness of the gasket 19 to prevent outward deflection thereof in the plane of the panel 18 between the attachment screws 24. Such deflection may occur during the use of the refrigerator and also during the assembly operation when the gasket 19 is secured in place by the screws 24. The door 10 is assembled while moving on a conveyor and the time available is not sufficient for carefully fitting a flabby gasket on the door structure.

The composite gasket 19 including the strip 26 is sufficiently flexible to be fitted over the upper rounded corners 27 of the inner panel 18, which corners are rounded to a radius of about three times the width of the composite gasket 19. The gasket 19, including the strip 26, is sufficiently resilient that it may be placed smoothly around the corners by slightly stretching the strip 26, the web 23, and the portion of the tubular section 26 and the flange 22 lying adjacent the web 23.

It will be apparent from the above that this invention provides a soft, resilient gasket for a refrigerator door which does not unduly oppose the closing of the door, which gasket is adapted for attachment to the door at intervals along the gasket, is prevented from buckling or outwardly bulging between the points of securement and is adapted to be bent smoothly at rounded corners of the door.

While I have shown my invention in several forms, it will be obvious to those skilled in the art that it is not so limited, but is susceptible of various other modifications and changes without departing from the spirit thereof, and I desire, therefore, that only such limitations shall be placed thereupon as are specifically set forth in the appended claims.

What I claim is:

1. In a gasket strip for a refrigerator cabinet, the combination of a broad, flat flange strip, a sealing strip overlying and spaced from said flange strip, a connecting strip joined at one of its side edges to a side edge of said sealing strip and at the other of its side edges to a side edge of said flange strip to form a gasket strip of approximately U-shaped section, said flange and sealing strips consisting of soft rubber and said connecting strip consisting at least in part of relatively harder rubber, said gasket strip being elastic to afford endwise stretching to such an extent that, when so stretched, it lies smoothly and unwrinkled when fitted around a corner of sheet material, said corner being rounded to a radius of three times the breadth of said flange strip and said gasket strip straddling the edge of said sheet material.

2. In a closure structure for the access opening of a refrigerator cabinet, the combination of a panel of sheet material having straight edges and at least one rounded corner, a gasket strip of approximately U-shaped section straddling said straight edges and rounded corner, one of the legs of said U-shaped gasket strip comprising a flat flange strip, the other leg comprising a sealing strip, and the base of said U-shaped section comprising a connecting strip joined at one side edge to a side edge of said flange strip and at the other side edge to a side edge of said sealing strip, said flange and sealing strips comprising soft rubber and said web strip comprising relatively harder rubber, said gasket strip being stretched at said rounded corner to prevent the formation of wrinkles due to compressive stresses at the inner free edge of the flange, said flange being secured to said panel only at intervals.

ORLAND H. YOXSIMER.

CERTIFICATE OF CORRECTION.

Patent No. 2,341,200.   February 8, 1944.

ORLAND H. YOXSIMER.

It is hereby certified that error appears in the printed specification of the above numbered patent requiring correction as follows: Page 1, first column, line 15-16, for "directions" read --direction--; page 2, first column, line 6, beginning with "In a gasket strip" strike out all to and including the word and period "material." in line 23, comprising claim 1, and insert instead the following -

> --In a gasket strip for a refrigerator cabinet, the combination of a broad, flat flange strip, a sealing strip overlying and spaced from said flange strip, a connecting strip joined at one of its side edges to a side edge of said sealing strip and at the other of its side edges to a side edge of said flange strip to form a gasket strip of approximately U-shaped section, said flange and sealing strips consisting of soft rubber and said connecting strip consisting at least in part of relatively harder rubber, said gasket strip being elastic to afford endwise stretching to such an extent that, when bent in an arc having a radius equal to three times the breadth of said flange with the web forming the outside element of said bend, the edge of said flange lying on the inside of said bend is free from wrinkles caused by endwise compression.--;

and that the said Letters Patent should be read with this correction therein that the same may conform to the record of the case in the Patent Office.

Signed and sealed this 18th day of April, A. D. 1944.

(Seal)

Leslie Frazer
Acting Commissioner of Patents.